US006102251A

United States Patent [19]
Strother

[11] Patent Number: 6,102,251
[45] Date of Patent: Aug. 15, 2000

[54] METHOD AND APPARATUS FOR EXTRACTING EXCESS MATERIAL FROM CONTAINERS

[75] Inventor: Arden R. Strother, Warren, Mich.

[73] Assignee: DaimlerChrysler Corporation, Auburn Hills, Mich.

[21] Appl. No.: 09/338,719

[22] Filed: Jun. 23, 1999

[51] Int. Cl.[7] .......... G01F 11/00

[52] U.S. Cl. .......... 222/1; 222/319; 222/386; 222/386.5; 222/399; 222/405; 141/65

[58] Field of Search .......... 222/1, 319, 389, 222/386, 386.5, 399, 405; 141/114, 65, 66

[56] References Cited

U.S. PATENT DOCUMENTS 2,564,163 8/1951 Leperre .......... 141/114
5,887,752 3/1999 Strother .......... 222/1
5,934,345 8/1999 Moynihan .......... 141/313

*Primary Examiner*—Steven O. Douglas
*Attorney, Agent, or Firm*—James R. Yee

[57] ABSTRACT

An apparatus for removing excess material from a container with a follower plate pump assembly comprising providing an air bladder, disposing the bladder within the container, connecting the bladder to the air source, and inflating the bladder via the source when the follower plate has reached a point in the container where it no longer has the ability to pump material, the air bladder forcing material up to the follower plate. A pump removes material from the container. The apparatus further includes an anti-fouling plate coupled to the bladder which prevents the bladder from interfering with the pump.

5 Claims, 4 Drawing Sheets

METHOD AND APPARATUS FOR EXTRACTING EXCESS MATERIAL FROM CONTAINERS

FIELD OF THE INVENTION

The present invention relates generally to extracting viscous materials from containers using a pump assembly that includes a follower plate which is lowered into the container as material is removed. More particularly, the present invention relates to an apparatus for extracting excess material from containers after the follower plate has moved into the container to the point where the pump has lost its ability to further remove material.

BACKGROUND OF THE INVENTION

Pumps for pumping viscous fluids from relatively large containers such as cylindrical drums conventionally employ a follower plate, with the pump mounted above an orifice through the follower plate. U.S. Pat. No. 4,792,063 to Moore, which is hereby incorporated by reference, describes such pumps. In such systems, the follower plate is introduced into the container as the liquid is evacuated via pneumatic, hydraulic, or spring-driven means or simply by the vacuum that results from the removal of material. The pumping action creates a partial vacuum as the follower plate is drawn into the container, until the pump loses the ability to withdraw further material from the drum. The descending follower plate scrapes excess material from the sides of the container and forces the liquid into the pump to prime it and keep it primed. Normally considerable excess material is left in the container at the point that no further material can be removed. A bag often is inserted into such containers prior to filling to facilitate removal of this excess material, but this does not provide an efficient way to remove that material.

U.S. Pat. No. 5,887,752 discloses an apparatus for extracting material from containers. The apparatus includes a pump, a follower plate and a pump section tube inserted in the follower plate and connected to the pump. The follower plate is inserted in the container and lowers as material is extracted. When the follower plate reaches a point where the pump no longer has the ability to pump material, there remains material in the container. A bladder is then inflated via an air source and material is forced towards the follower plate where it can be extracted. However, as the bladder is inflated it may be ingested into or block the pump section tube.

The present invention is aimed at overcoming one or more of the problems identified above.

SUMMARY OF THE INVENTION

In one aspect of the present invention, a pump assembly in connection with a container for removing a material from the container is provided. The pump assembly includes a follower plate disposed in the container for vertical movement, a pump connected to the follower plate, and an air bladder disposed in the container below the material. The assembly further includes an anti-fouling plate coupled to the air bladder and positioned between the material and the follower plate. An air source is located external to the container and a flexible hose interconnects the air bladder and the air source.

DETAILED DESCRIPTION OF THE INVENTION

Figure 1:
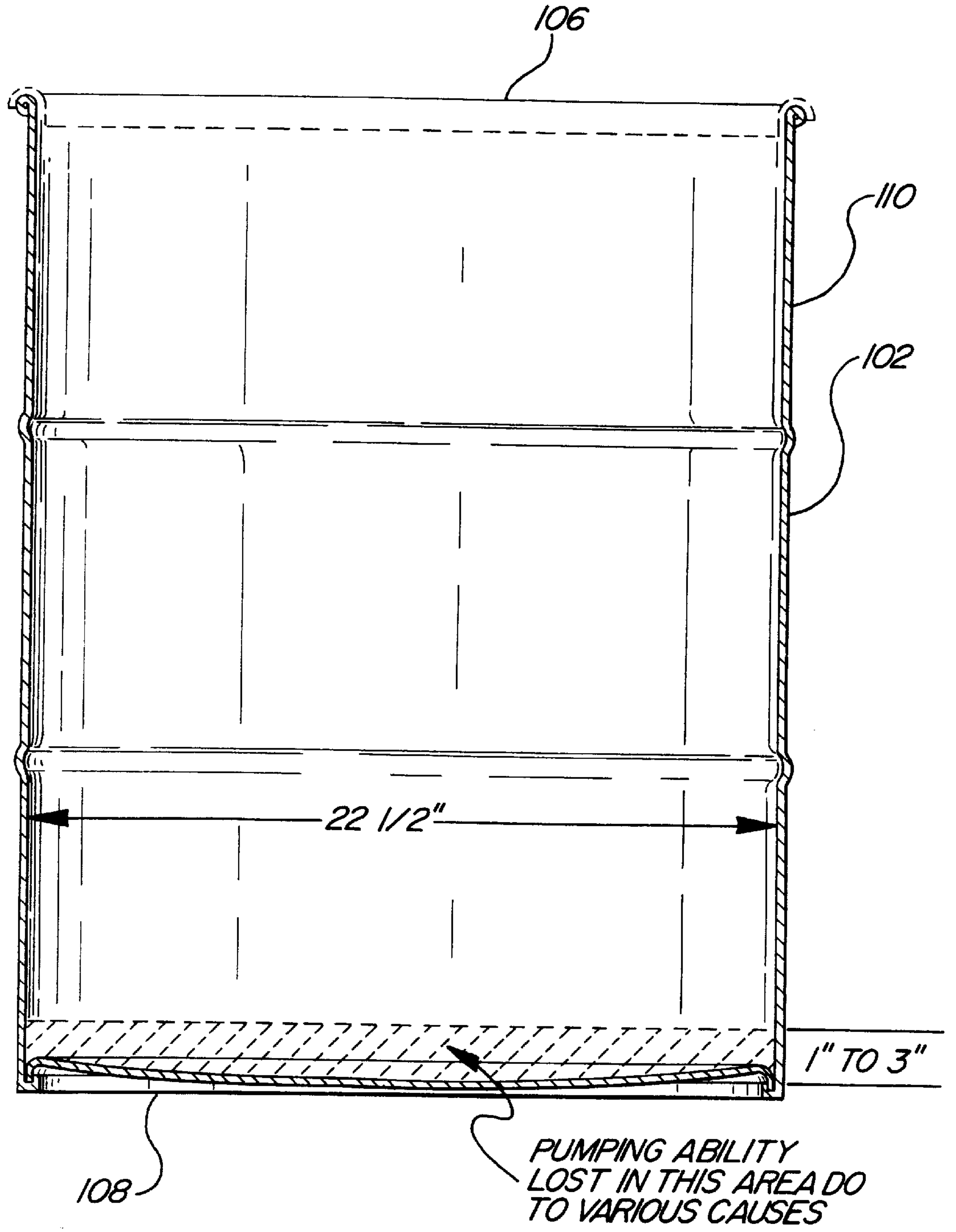
FIG. 1 shows a front cut-away view of a typical cylindrical container with which the apparatus of the present invention may be used.

Turning first to FIG. 1, a typical cylindrical container 102 with which the apparatus of the present invention may be used is shown. Container 102 is cylindrical in shape and has a top wall 106, a bottom wall 108, and annular side wall 110 connecting the tube. Such containers, often called "drums," typically are up to three feet in height. When a follower plate type pump assembly is used to extract viscous materials from such a container, typically the pumping ability of the assembly is lost when from 1 to 3 inches of material remains in the container, as shown in FIG. 1. Such containers typically are used to store such viscous materials as adhesives or sealants.

Figure 2:
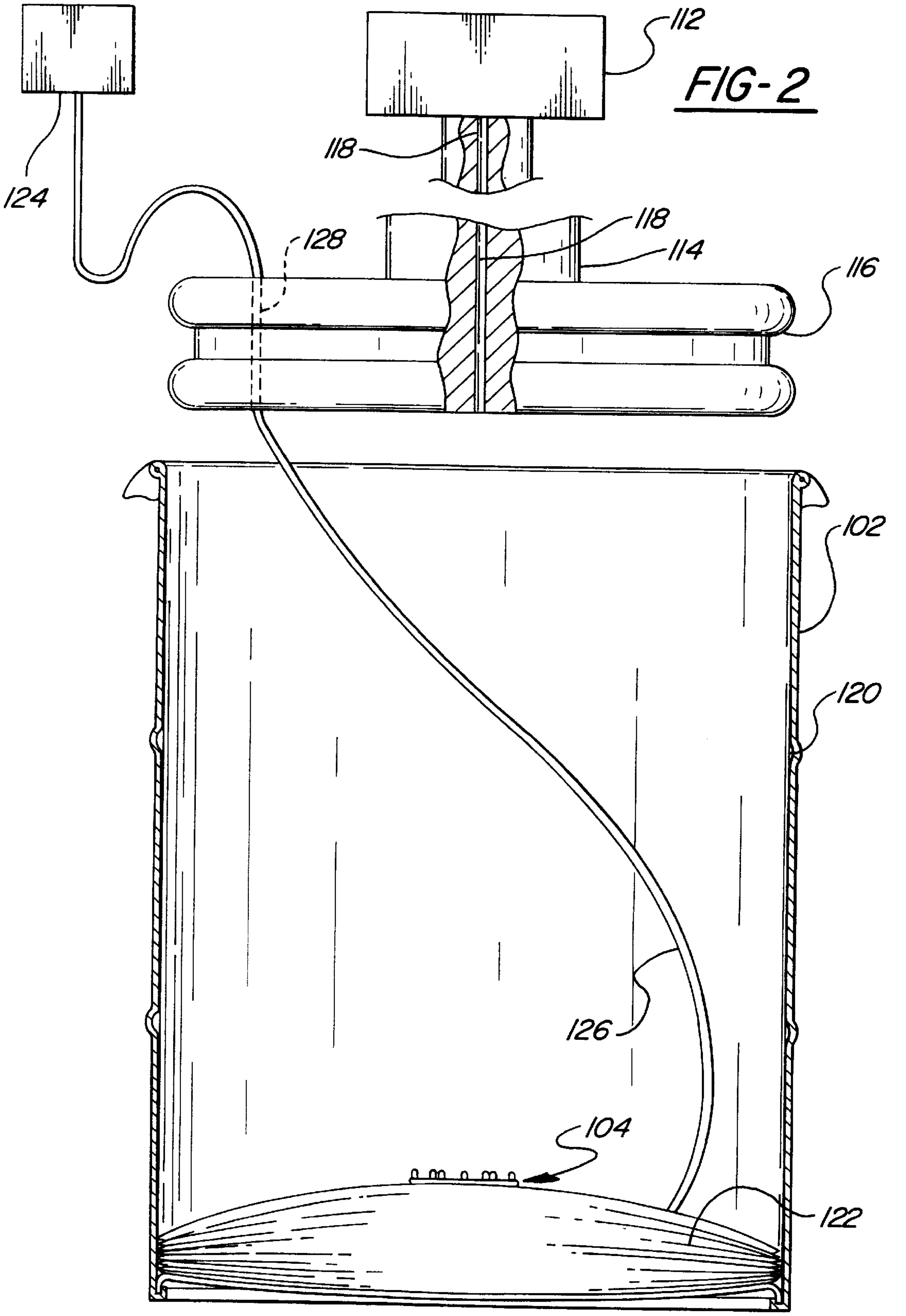
FIG. 2 shows a front partially cut-away schematic view of the apparatus of the present invention in use with a cylindrical container.
Figure 3:
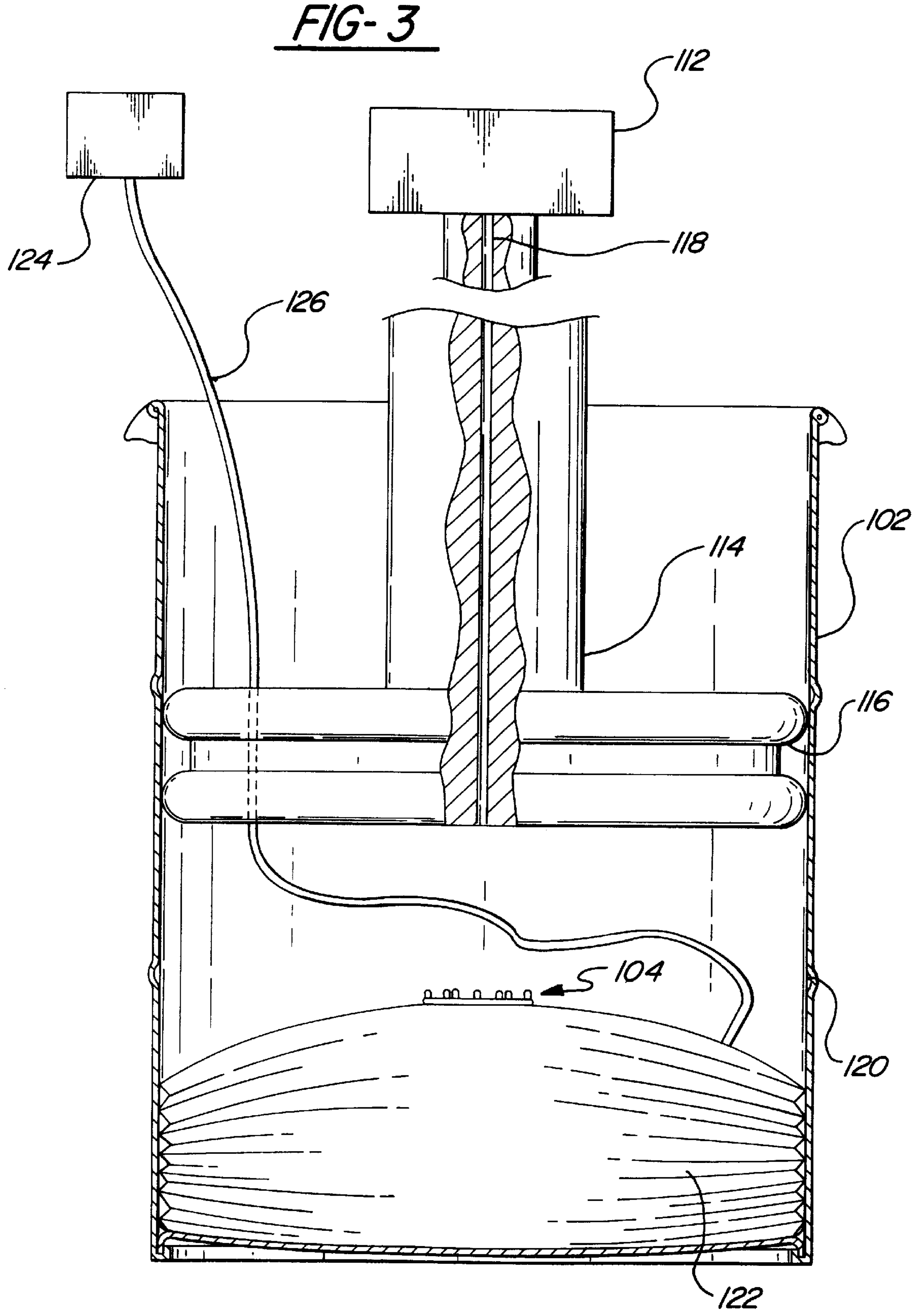
FIG. 3 shows a front partially cut-away schematic view of the apparatus of the present invention with the follower plate drawn into the container.

Turning to FIG. 2 and FIG. 3, a conventional container is shown in use with the apparatus and method of the present invention. Material is pumped from container 102 via pumping means 114 which further comprises pump 112 operably connected to follower plate 116 via orifice 118. As pumping occurs, a partial vacuum is created, drawing follower plate 116 into container 102, as shown in FIG. 3. Bag member 120 may be inserted within container 102 prior to its being filled, to allow manual removal of material left in the container after the pump loses its ability to pump. Bag member 120 also maintains the container in a clean state.

The air bladder 122 is inserted into the bottom bag member 120 prior to filling the container. Bladder 122 is connected to air source 124 via hose 126, which in the preferred embodiment passes through follower plate 116 via aperture 128. Hose 126 may be one piece or several connected pieces. Air source 124 is used to inflate bladder 122 via hose 126 when the follower plate has descended into the container to the point where the pumping means ceases to pump. As the bladder is inflated, it forces excess material up to the follower plate, allowing greater retrieval of the material. As the follower plate moves down, air hose 126, which is manufactured of a flexible material and which is of sufficient length, conforms to the reduced space below the follower plate. Sufficient excess hose length also is provided above the follower plate to account for the downward movement.

In the preferred embodiment the air source is external to the container and the air hose passes through the follower plate, and preferred air pressure is 10–110 psi. That need not be the case, and any appropriate configuration and any pressure may be used.

With reference to FIGS. 2–5, an anti-fouling plate 104 is coupled to the air bladder 122 and positioned between the material and the follower plate 116. The anti-fouling plate 104 prevents the bladder 122 from interfering with the pump 112. The anti-fouling plate 104 may be composed of any suitably stiff material and may be dependent upon the type of material contained in the container 102.

Figure 4:
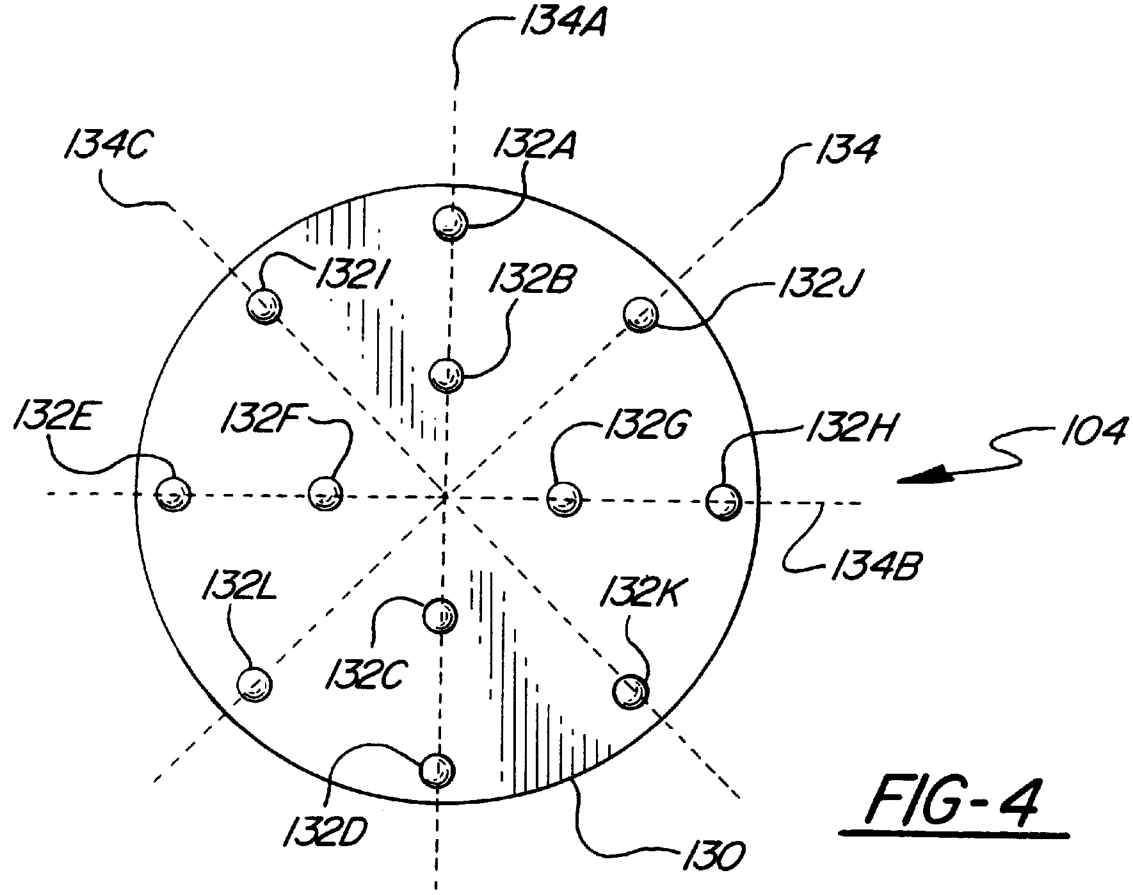
FIG. 4 shows a top down view of an anti-fouling plate coupled to a bladder of the apparatus; and, FIG. 5 shows a side view of the anti-fouling plate of FIG. 4.
Figure 5:
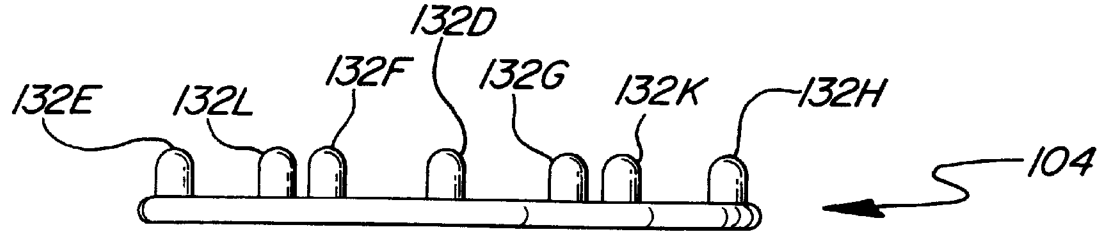

With specific reference to FIG. 4, the anti-fouling plate 104 has a base portion 130 which preferably has a circular shape.

In one embodiment, the anti-fouling plate 104 includes a plurality of projections 132A–132L extending from an outer surface of the base portion 130 toward the follower plate 116.

In another embodiment, the anti-fouling plate 104 includes at least eight (8) projections 132A–132H extending from an outer surface of the base portion 130 toward the follower plate 116. The eight projections 132A–132H are arranged along first and second perpendicular axis 134A, 134B.

In still another embodiment, at least an additional four (4) projections 132J–132L are arranged on third and fourth perpendicular axes 134C, 134D.

While particular embodiments of the invention have been described above, the invention is not so limited. Alternative embodiments and modification which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A pump assembly in connection with a container for removing a material from the container, the pump assembly including:

a follower plate disposed in the container for vertical movement;

a pump connected to the follower plate;

an air bladder disposed in the container below the material;

an anti-fouling plate coupled to the air bladder and being positioned between the material and the follower plate;

an air source located external to the container;

a flexible hose interconnecting the air bladder and the air source.

2. A pump assembly, as set forth in claim 1, further including a bag member inserted into the container, the bag member containing the material, air bladder and the anti-fouling plate.

3. A pump assembly, as set forth in claim 1, wherein the anti-fouling plate includes a plurality of projections extending from an outer surface of the anti-fouling plate toward the follower plate.

4. A pump assembly, as set forth in claim 1, wherein the anti-fouling plate includes at least eight projections extending from an outer surface of the anti-fouling plate toward the follower plate, wherein a first four of the eight projections are spaced along a first axis of the anti-fouling plate and a second four of the eight projections are spaced along a second axis of the anti-fouling plate.

5. A pump assembly, as set forth in claim 4, wherein the first and second axes are at right angles.

* * * * *